(12) United States Patent
Tokai

(10) Patent No.: US 7,590,662 B2
(45) Date of Patent: Sep. 15, 2009

(54) REMOTE SUPPORTING APPARATUS, REMOTE SUPPORTING SYSTEM, REMOTE SUPPORTING METHOD, AND PROGRAM PRODUCT THEREFOR

(75) Inventor: Kiwame Tokai, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 359 days.

(21) Appl. No.: 11/583,778

(22) Filed: Oct. 20, 2006

(65) Prior Publication Data
US 2008/0010317 A1  Jan. 10, 2008

(30) Foreign Application Priority Data
Jun. 23, 2006   (JP)  ............................. 2006-174630

(51) Int. Cl.
*G06F 17/00* (2006.01)

(52) U.S. Cl. .................... 707/104.1; 707/100; 707/101; 707/102

(58) Field of Classification Search ......... 707/100–102, 707/104.1
See application file for complete search history.

(56) References Cited

U.S. PATENT DOCUMENTS 5,940,049 A * 8/1999 Hinman et al. ................. 353/20
2004/0070674 A1 4/2004 Foote et al.

FOREIGN PATENT DOCUMENTS

JP   A 2000-188655   7/2000
JP   A 2005-033756   2/2005

* cited by examiner

*Primary Examiner*—Sana Al-Hashemi
(74) *Attorney, Agent, or Firm*—Oliff & Berridge, PLC

(57) ABSTRACT

A remote supporting apparatus including a first receiving unit that receives information about a first annotation image from another device, a projecting unit that projects an image on a predetermined projection region in cooperation with the another device in accordance with the information about the first annotation image received from the first receiving unit, a recording unit that records an image of the projection region, a first transmitting unit, a second transmitting unit, a second receiving unit, and a displaying unit that displays an image in accordance with the information about the recorded image received by the second receiving unit.

14 Claims, 6 Drawing Sheets

REMOTE SUPPORTING APPARATUS, REMOTE SUPPORTING SYSTEM, REMOTE SUPPORTING METHOD, AND PROGRAM PRODUCT THEREFOR

BACKGROUND

1. Technical Field

The present invention generally relates to a remote supporting apparatus that performs an operation for projecting an image on a predetermined projection region in cooperation with another device, a remote supporting system that includes the remote supporting apparatus, and a remote supporting method to be utilized in the remote supporting apparatus.

2. Related Art

During presentations, images of materials (slides) prepared with presentation software in personal computers (PCs) are often projected on screens by projectors.

In such image processing, an image sent from a remote place is projected with a projector, an image of the screen having the image projected thereon is recorded, and the image information obtained through the recording is transmitted to a remote place. Alternatively, a picture drawn by a user with a pen or the like is displayed on an electronic whiteboard at own site, and a picture that is originally drawn on an electronic whiteboard is also displayed at another site and is received and converted by a communication controller on the electronic whiteboard at the own site.

SUMMARY

An aspect of the present invention provides a remote supporting apparatus including: a first receiving unit that receives information about a first annotation image from another device; a projecting unit that projects an image on a predetermined projection region in cooperation with the another device in accordance with the information about the first annotation image received from the first receiving unit; a recording unit that records an image of the projection region; a first transmitting unit that transmits image information about the recorded image obtained by the recording unit, as image information about an image to be displayed on the another device, to the another device; a second transmitting unit that transmits information about a second annotation image to be projected on a projection region at a site at which the another device is placed; a second receiving unit that receives information about a recorded image obtained by recording an image of the projection region at the site at which the another device is placed, the information being received from the another device; and a displaying unit that displays an image in accordance with the information about the recorded image received by the second receiving unit.

BRIEF DESCRIPTION OF THE DRAWINGS

Embodiments of the present invention will be described in detail based on the following figures, wherein.

DETAILED DESCRIPTION

Figure 1:
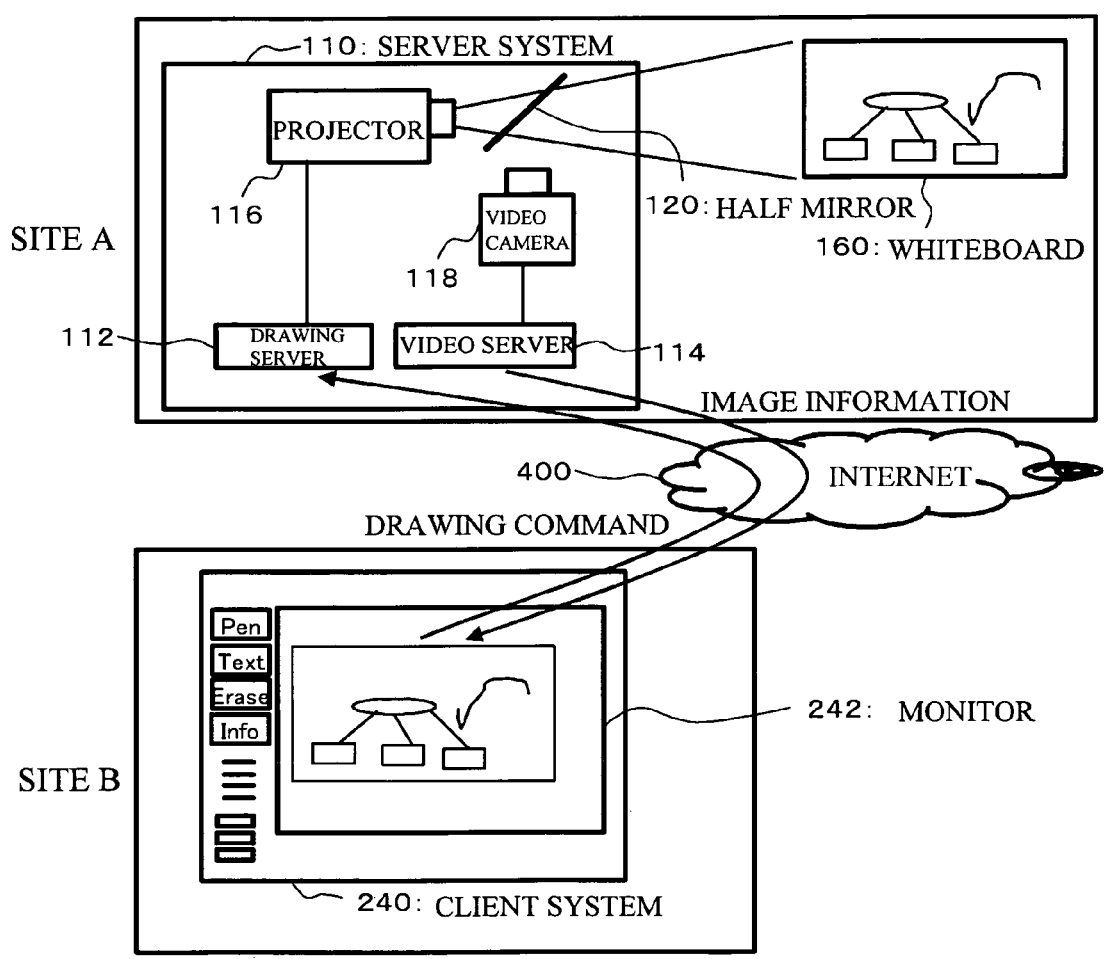
FIG. 1 illustrates the basic structures of remote supporting apparatuses that constitute a remote supporting system.

A description will now be given, with reference to the accompanying drawings, of exemplary embodiments of the present invention. FIG. 1 illustrates the structures of remote supporting apparatuses that form a remote supporting system. In FIG. 1, a server system 110 as a remote supporting apparatus and a whiteboard 160 are placed at site A, and a client system 240 as a remote supporting apparatus is placed at site B.

The server system 110 at the site A includes a drawing server 112, a video server 114, a projector 116, a video camera 118, and a half mirror 120. Meanwhile, a client system 240 at the site B includes a monitor 242. The drawing server 112 and the video server 114 in the server system 110 at the site A are communicably connected to the client system 240 at the site B with the Internet 400.

In this exemplary embodiment, the same client system as the client system 240 at the site B is provided together with the server system 110, so as to form a remote supporting apparatus at the site A. The same server system as the server system 110 at the site A is provided together with the client system 240, so as to form a remote supporting apparatus at the site B. A whiteboard is also provided at the site B, thereby forming a remote supporting system.

Figure 2:
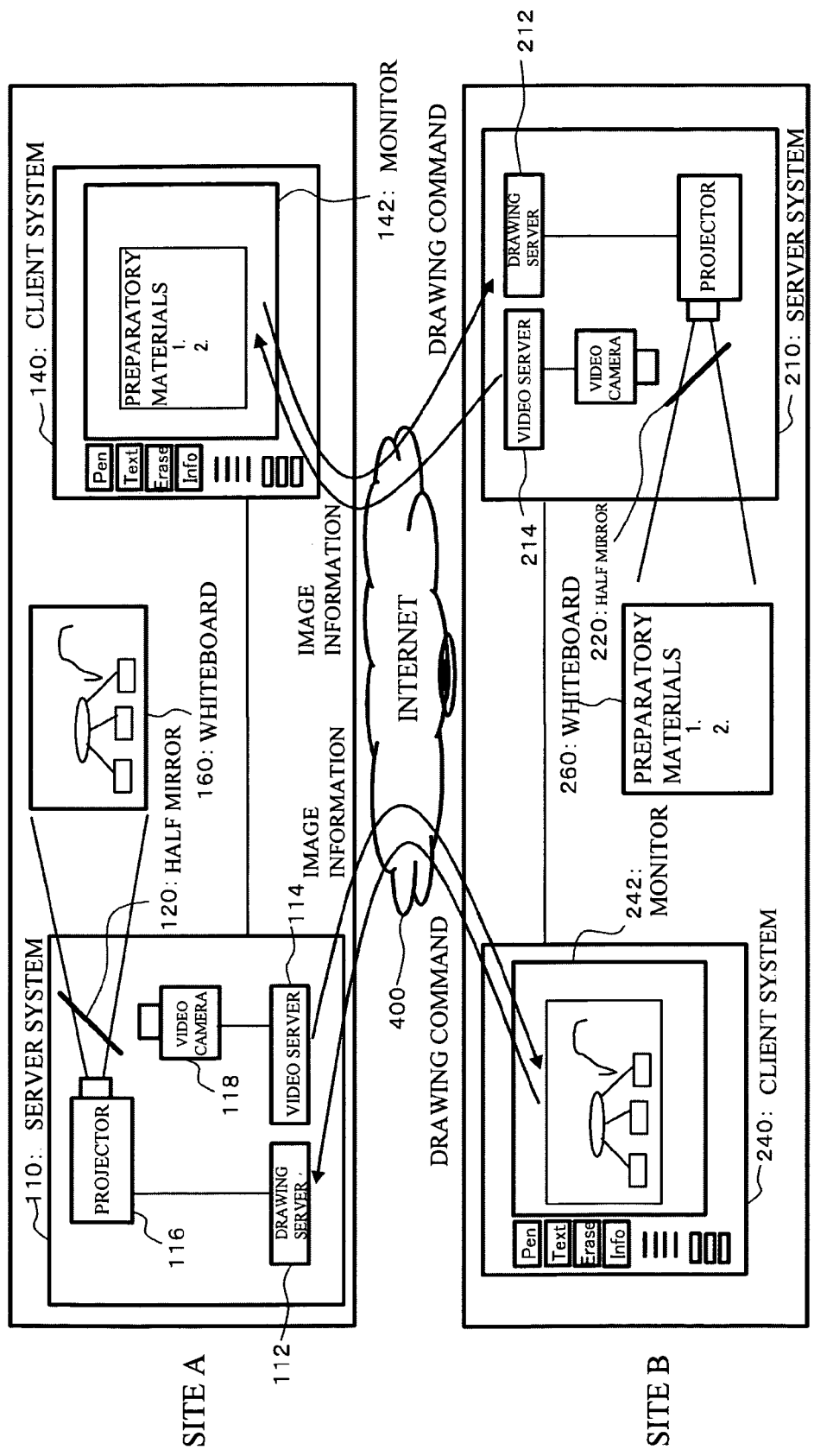
FIG. 2 illustrates the structure of the remote supporting system.

FIG. 2 illustrates the structure of the remote supporting system. In the remote supporting system illustrated in FIG. 2, the server system 110 and a client system 140 as a remote supporting apparatus, and the whiteboard 160 are set at the site A. The client system 140 includes a monitor 142. Meanwhile, a server system 210 and the client system 240 as a remote supporting apparatus, and a whiteboard 260 are set at the site B. The server system 210 is formed with a drawing server 212, a video server 214, a projector 216, a video camera 218, and a half mirror 220. The client system 140 at the site A is communicably connected to the drawing server 212 and the video server 214 in the server system 210 at the site B with the Internet 400.

The server system 110 at the site A performs an operation for projecting an image at the site A in response to a request from the client system 240 at the site B. Likewise, the server system 210 at the site B performs an operation for projecting an image at the site B in response to a request from the client system 140 at the site A. The operations are described below in greater details.

In accordance with an operation instruction of the user at the site B, the client system 240 at the site B generates a drawing command as an instruction for projecting an annotation image such as an explanatory note, and information about the annotation image. The client system 240 then transmits the drawing command and the information to the drawing server 112 in the server system 110 at the site A via the Internet 400.

In response to the received drawing command, the drawing server 112 outputs the information about the annotation image together with the drawing command to the projector 116. If there is image information that has already been held by the drawing server 112, the drawing server 112 outputs the image information to the projector 116. The projector 116 projects an image in accordance with the input image information, onto the whiteboard 160 via the half mirror 120.

An image is projected on the white board 160 by the projector 116, and characters or the likes are written on the whiteboard 160 by the user of the site A. The video camera 118 records, through the half mirror 120, the whiteboard 160 having an image projected thereon and characters or the likes written thereon. The video camera 118 has various settings for panning, tilting, zooming, and the likes, so that the video camera 118 has the same field angle and the same optical axis as the projector 116. The image information obtained through the recording is output to the video server 114. The video server 114 transmits the input image information to the client system 240 at the site B via the Internet 400.

The client system 240 at the site B displays the received image information on the monitor 242. Accordingly, the user of the site B can recognize the image on the whiteboard 160 at the site A.

The same operation as above is performed between the client system 140 at the site A and the server system 210 at the site B. In accordance with an operation instruction from the user of the site A, the client system 140 at the site A generates a drawing command as an instruction for projecting an annotation image, and information about the annotation image. The client system 140 then transmits the drawing command and the information to the drawing server 212 in the server system 210 at the site B via the Internet 400.

In response to the received drawing command, the drawing server 212 outputs the information about the annotation image together with the drawing command to the projector 216. If there is image information that has already been held by the drawing server 212, the drawing server 212 outputs the image information to the projector 216. The projector 216 projects an image in accordance with the input image information, onto the whiteboard 260 via the half mirror 220.

An image is projected on the whiteboard 260 by the projector 216, and characters or the likes are written on the whiteboard 260 by the user of the site B. The video camera 218 records, through the half mirror 220, the whiteboard 260 having an image projected thereon and characters or the likes written thereon. The video server 214 transmits the input image information to the client system 140 at the site A via the Internet 400.

The client system 140 at the site A displays the received image information on the monitor 142. Accordingly, the user of the site A can recognize the image on the whiteboard 260 at the site B.

In the following, the operations of the server system 110 at the site A and the client system 240 at the site B are described, with reference to flowcharts.

Figure 3:
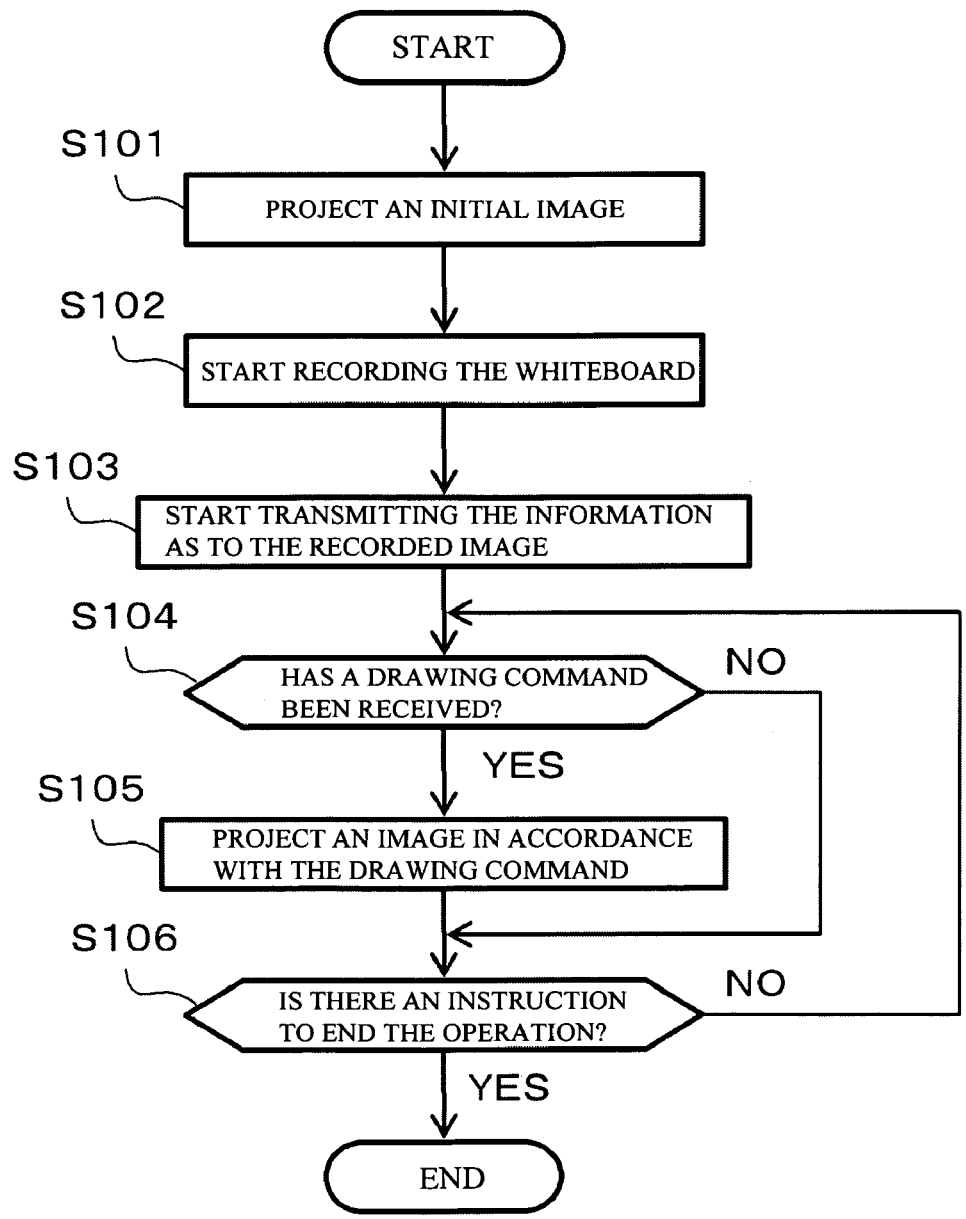
FIG. 3 is a flowchart showing an operation to be performed by each server system.

FIG. 3 is a flowchart showing the operation to be performed by the server system 110 at the site A. The drawing server 112 in the server system 110 at the site A outputs already held image information to the projector 116. The projector 116 projects the image in accordance with the input image information (the initial image), onto the whiteboard 160 through the half mirror 120 (S101).

The video camera 118 starts recording the whiteboard 160 (S102). The image information through the recording (the information about the recorded image) is output to the video server 114. The video server 114 starts transmitting the input image information to the client system 240 at the site B (S103). After that, the video camera 118 continues recording the whiteboard 160, and the video server 114 keeps transmitting image information to the client system 240 at the site B every time image information is input.

The drawing server 112 determines whether it has received a drawing command from the client system 240 at the site B (S104) If having received a drawing command, the drawing server 112 outputs the information about the annotation image attached to the drawing command to the projector 116 in accordance with the drawing command. The projector 116 projects the image in accordance with the input information about the annotation image, onto the whiteboard 160 via the half mirror 120 (S105). As a result, the initial image and an image such as an explanatory note in accordance with the information about the annotation image attached to the drawing command from the client system 240 at the site B are projected onto the whiteboard 160. In the image recorded by the video camera 118, problems such as uncolored portions might be caused in the image formed in accordance with the information about the annotation image from the client system 240 at the site B. With such problems being taken into consideration, the video server 114 may generate image information about a combined image formed by overlapping the image formed in accordance with the information about the annotation image from the client system 240 at the site B on the position of the image formed in accordance with the information about the annotation image from the client system 240 at the site B in the image recorded by the video camera 118. The video server 114 may transmit the image information to the client system 240 at the site B.

After the image projection in step S105, or if the drawing server 112 determines that it has not received a drawing command yet in step S104, the server system 110 determines whether the user of the site A has issued an instruction to end the operation (S106). If there is an instruction to end the operation, the operation comes to an end. If there is not such an instruction, the procedure for determining whether the drawing server 112 has received a drawing command (S104) and the procedures thereafter are repeated.

Figure 4:
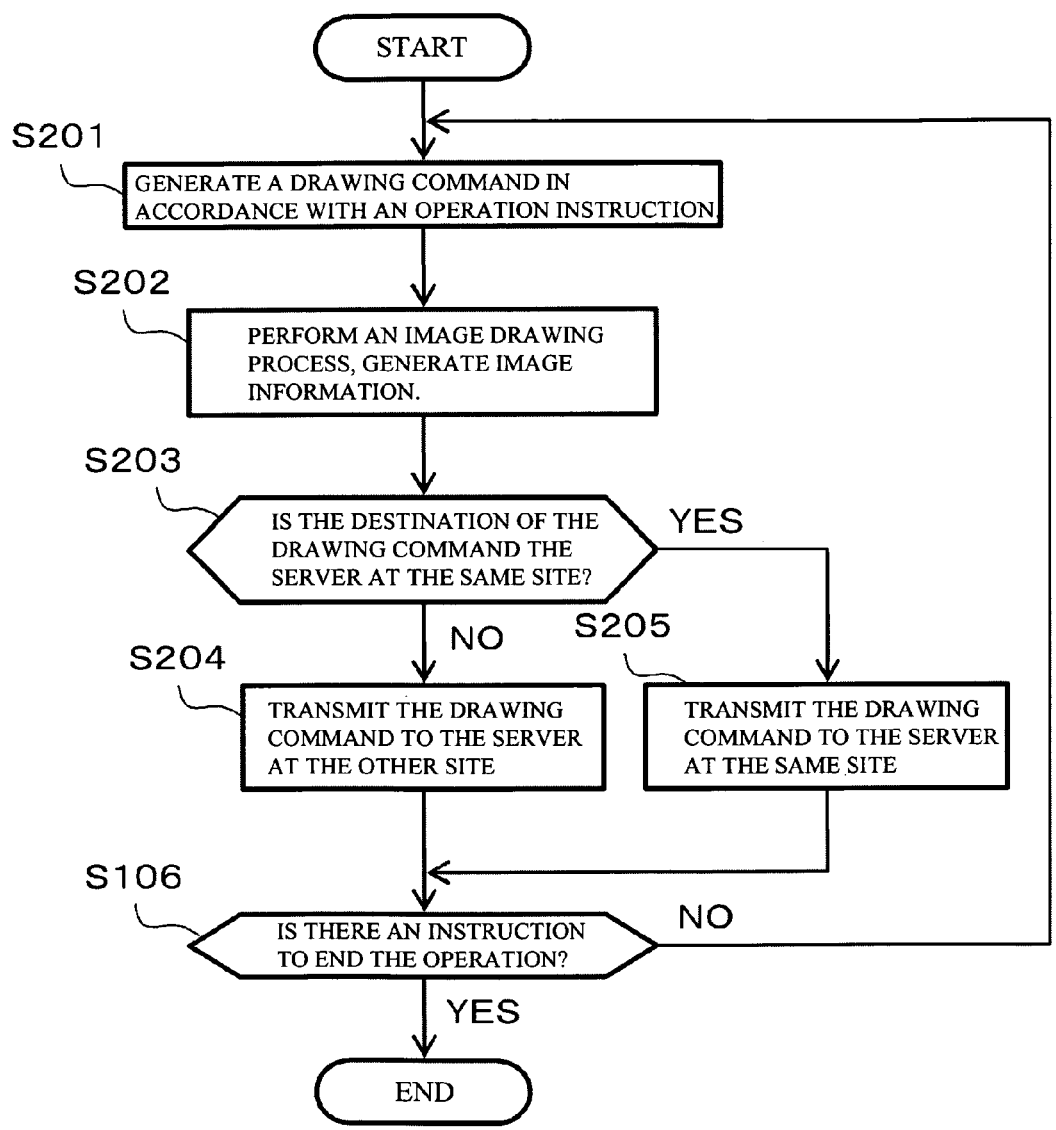
FIG. 4 is a flowchart showing an operation to be performed by each client system.

FIG. 4 is a flowchart showing the operation to be performed by the client system 240 at the site B. In accordance with an operation instruction from the user of the site B, the client system 240 generates the drawing command for projecting an annotation image such as an explanatory note on the whiteboard 160 at the site A or the whiteboard 260 at the site B (S201).

The client system 240 then performs an image drawing process, and generates the information about the annotation image to be projected onto the whiteboard 160 at the site A or the whiteboard 260 at the site B (S202). The client system 240 determines whether the destination of the drawing command is the server system 210 that is also located at the site B (S203). For example, the user of the site B designates the destination through the operation instruction for the generation of the drawing command, and the client system 240 detects the destination from the operation instruction.

In a case where the destination of the drawing command is not the server system 210 also located at the site B, the client system 240 adds the annotation image information generated in step S202 to the drawing command, and transmits the drawing command to the drawing server 112 in the server system 110 at the site A (S204) As a result, the server system 110 carries out the procedure of step S105 of FIG. 3.

In a case where the destination of the drawing command is the server system 210 also located at the site B, the client system 240 adds the annotation image information generated in step S202 to the drawing command, and transmits the drawing command to the server system 210 (S205). In this case, the drawing server 212 in the server system 210 outputs the annotation image information attached to the received drawing command to the projector 216, and the projector 216 projects the image in accordance with the annotation image information onto the whiteboard 260.

After the transmission of the drawing command in step S204 or S205, the client system 240 determines whether there is an instruction to end the operation from the user of the site B (S206). If there is an instruction to end the operation, the operation comes to an end. If there is not an instruction to end the operation, the procedure for generating a drawing command (S201) and the procedures thereafter are repeated.

The server system 210 at the site B performs the same operation as that illustrated in FIG. 3, and the client system 140 at the site A performs as same operation as that illustrated in FIG. 4.

As described above, in the remote supporting system, an image in accordance with annotation image information from the client system 240 at the site B is displayed on the whiteboard 160 at the site A. Likewise, an image in accordance with annotation image information from the client system 140 at the site A is displayed on the whiteboard 260 at the site B. A recorded image of the whiteboard 260 at the site B is displayed on the monitor 142 at the site A, and a recorded image of the whiteboard 160 at the site A is displayed on the monitor 242 at the site B. Accordingly, the whiteboard as the projection region at each site is used as a work area, so that cooperative operations can be performed between the sites, and communications become easier between users.

Figure 5:
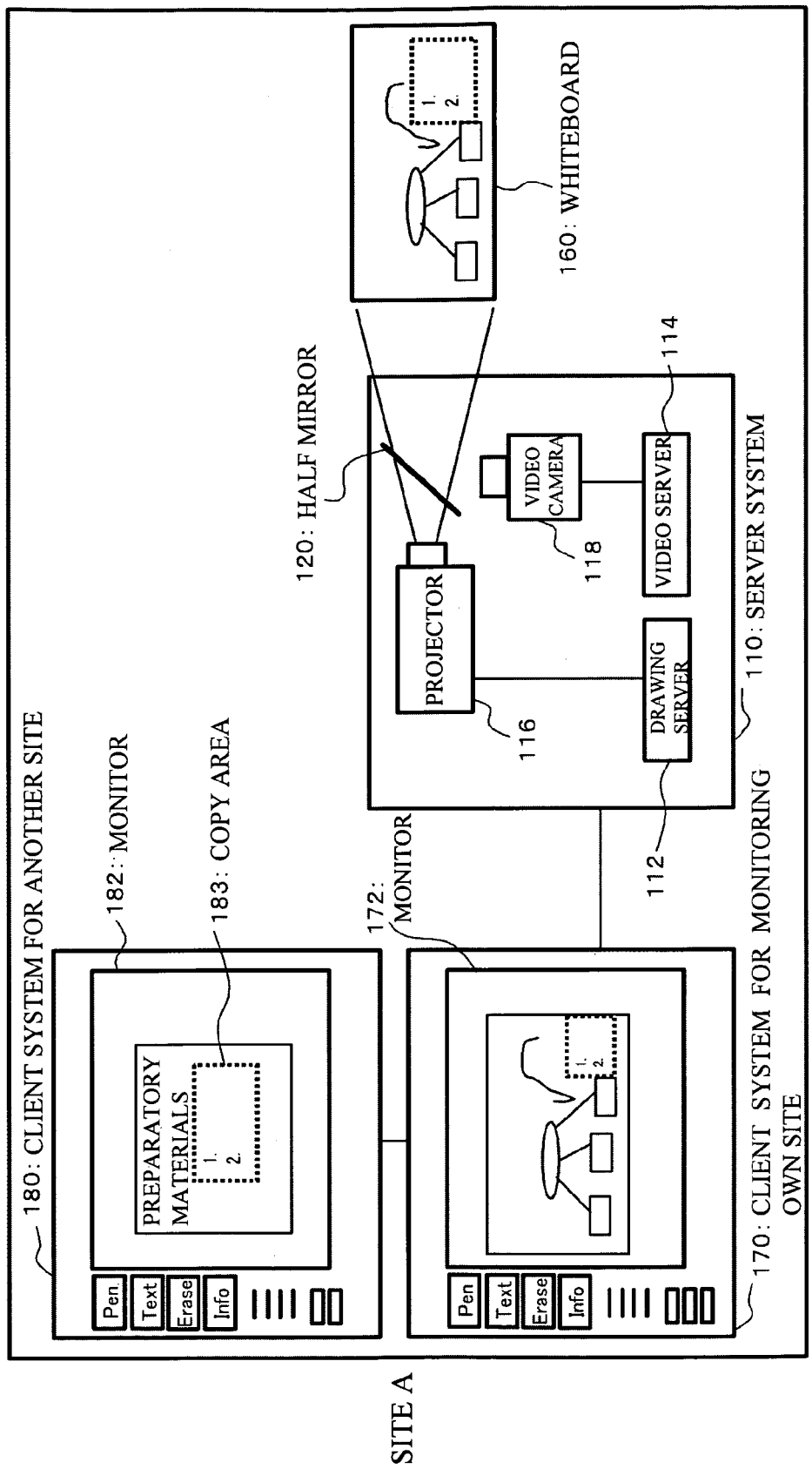
FIG. 5 illustrates another example structure of a remote supporting apparatus.

The present invention is not limited to the above-described exemplary embodiment, but various changes may be made to it. FIG. 5 illustrates another example structure of the remote supporting apparatus at the site A. In FIG. 5, a server system 110 as a remote supporting apparatus, a client system 170 for monitoring own site, a client system 180 for another site, and a whiteboard 160 are placed at the site A. The same structure may be employed at the site B.

The client system 180 for another site includes a monitor 182. The client system 180 for another site receives image information obtained by recording an image of the whiteboard 260, and displays the image in accordance with the image information on the monitor 182.

The user of the site A can issue such an operation instruction as to designate a part of the image displayed on the monitor 182 to be displayed on the whiteboard 160. If such an instruction is issued, the client system 180 for another site selects the designated part of the image as a copy area 183, and transmits the image information about the copy area 183 to the client system 170 for monitoring own site.

Upon receipt of the image information about the copy area 183, the client system 170 for monitoring own site generates image information about a combined image of an image in accordance with the image information and an image in accordance with already held image information. The client system 170 for monitoring own site also displays the combined image on a monitor 172, and transmits the image information about the copy area 183 to the server system 110.

The drawing server 112 in the server system 110 outputs the received image information about the copy area 183 to the projector 116. The projector 116 projects the combined image about the image information on the whiteboard 160.

In this manner, at the site A, a part of the image in accordance with the image information obtained by recording an image of the whiteboard 260 at the site B is selected in accordance with an operation instruction from the user of the site A, and the selected part of the image is projected on the whiteboard 160.

Figure 6:
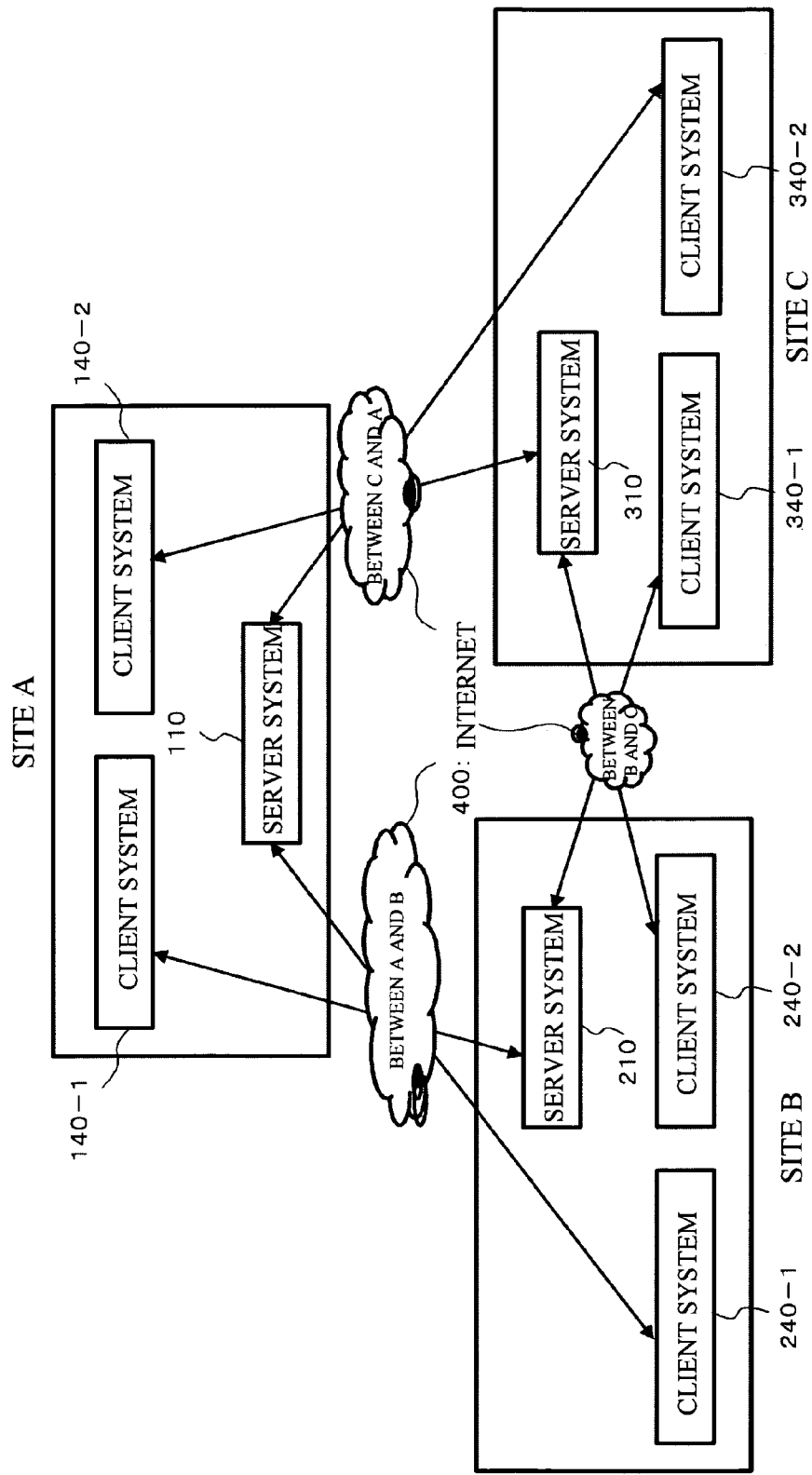
FIG. 6 illustrates another example structure of a remote supporting system.

In the above-described exemplary embodiment, remote supporting apparatuses are placed at the two sites A and B in a remote supporting system. However, the present invention may be applied to a remote supporting system having remote supporting apparatuses placed at three or more sites. FIG. 6 illustrates an example case where remote supporting apparatuses are placed at three sites A, B, and C. At the site A, a server system 110 as a remote supporting apparatus and client systems 140-1 and 140-2 are placed. At the site B, a server system 210 as a remote supporting apparatus and client systems 240-1 and 240-2 are placed. At the site C, a server system 310 as a remote supporting apparatus and client systems 340-1 and 340-2 are placed.

In this imaging system, the server system 110 at the site A is communicably connected to the client system 240-1 at the site B and the client system 340-2 at the site C via the Internet 400. In response to each request from the client systems 240-1 and 340-2, the server system 110 at the site A performs an image projecting operation at the site A. Likewise, the server system 210 at the site B is communicably connected to the client system 140-1 at the site A and the client system 340-1 at the site C via the Internet 400. In response to each request from the client systems 140-1 and 340-1, the server system 210 at the site B performs an image projecting operation at the site B. The server system 310 at the site C is communicably connected to the client system 140-2 at the site A and the client system 240-2 at the site B via the Internet 400. In response to each request from the client systems 140-2 and 240-2, the server system 310 at the site C performs an image projecting operation at the site C.

As described so far, the remote supporting apparatuses, the remote supporting systems, and the remote supporting method in accordance with the present invention enable smooth communications between users at different sites, and are suitable for remote supporting apparatuses.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A remote supporting apparatus comprising:

a first receiving unit that receives information about a first annotation image from another device;

a projecting unit that projects an image on a first predetermined projection region in cooperation with the another device in accordance with the information about the first annotation image received from the first receiving unit;

a recording unit that records the image of the first predetermined projection region;

a first transmitting unit that transmits image information about the image of the first predetermined projection region recorded by the recording unit, as image information about the image of the first predetermined projection region to be displayed on the another device, to the another device;

a second transmitting unit that transmits information about a second annotation image to be projected on a second predetermined projection region at a site at which the another device is placed;

a second receiving unit that receives information about a recorded image of the second predetermined projection region at the site at which the another device is placed, the information being received from the another device; and a displaying unit that displays an image in accordance with the information about the recorded image of the second predetermined projection region received by the second receiving unit.

2. The remote supporting apparatus according to claim 1, further comprising a selecting unit that selects at least a part of the image of the first predetermined projection region recorded by the recording unit of the another device and displayed on the display unit, wherein the projecting unit projects the part of the image selected by the selecting unit on the first predetermined projection region.

3. The remote supporting apparatus according to claim 1, further comprising a generating unit that generates a combined image having a drawn version of the first annotation image superimposed on the first annotation image contained in the image of the first predetermined projection region recorded by the recording unit, wherein the first transmitting unit transmits image information about the combined image generated by the generating unit to the another device.

4. The remote supporting apparatus according to claim 1, wherein:

the first receiving unit receives the first annotation image information from the another device and a first drawing instruction to project the image in accordance with the first annotation image information; and the projecting unit projects the image in accordance with the first annotation image information received by the first receiving unit on the first predetermined projection region in accordance with the first drawing instruction received by the first receiving unit.

5. The remote supporting apparatus according to claim 1, wherein the second transmitting unit transmits the second annotation image information and a second drawing instruction to project an image in accordance with the second annotation image information.

6. The remote supporting apparatus according to claim 5, further comprising a generating unit that generates the second drawing instruction in accordance with an operation instruction from a user, wherein the first transmitting unit transmits the second drawing instruction generated by the generating unit.

7. The remote supporting apparatus according to claim 1, wherein:

the remote supporting apparatus is formed with a server and a client;

the server is communicably connected to a client in the another device; and the client is communicably connected to a server in the another device.

8. A remote supporting system comprising a plurality of remote supporting apparatuses performing communications based on images, each of the plurality of remote supporting apparatuses including:

a first receiving unit that receives information about a first annotation image from another device;

a projecting unit that projects an image on a first predetermined projection region in cooperation with the another device in accordance with the information about the first annotation image received from the first receiving unit;

a recording unit that records the image of the first predetermined projection region;

a first transmitting unit that transmits image information about the image of the first predetermined projection region recorded by the recording unit, as image information about the image of the first predetermined projection region to be displayed on the another device, to the another device;

a second transmitting unit that transmits information about a second annotation image to be projected on a second predetermined projection region at a site at which the another device is placed;

a second receiving unit that receives information about a recorded image obtained by recording an image of the projection region at the site at which the another device is placed, the information being received from the another device; and a displaying unit that displays an image in accordance with the information about the recorded image of the second predetermined projection region received by the second receiving unit.

9. A remote supporting method comprising:

receiving information about a first annotation image from another device;

projecting an image on a first predetermined projection region in cooperation with the another device in accordance with the information about the first annotation image received in the step of receiving the first annotation image information;

recording the image of the first predetermined projection region;

transmitting image information about the image of the first predetermined projection region recorded in the step of recording the image of the first predetermined projection region, as image information about the image of the first predetermined projection region to be displayed on the another device, to the another device;

transmitting information about a second annotation image to be projected on a second predetermined projection region at a site at which the another device is placed;

receiving information about the recorded image obtained by recording the image of the projection region at the site at which the another device is placed, the information being received from the another device; and displaying an image in accordance with the information about the recorded image of the second predetermined projection region received in the step of receiving the recorded image.

10. The remote supporting method according to claim 9, further comprising selecting a part of the image of the first predetermined projection region recorded by a recording unit of the another device and displayed in the step of displaying an image, wherein the step of projecting the image includes projecting the part of the image selected in the selecting step on the first predetermined projection region.

11. The remote supporting method according to claim 9, further comprising:

generating a combined image having a drawn version of the first annotation image superimposed on the first annotation image contained in the image of the first predetermined projection region recorded in the step of recording the image of the projection region; and transmitting image information about the combined image to the another device.

12. The remote supporting method according to claim 9, wherein:

the step of receiving the first annotation image information includes receiving the first annotation image information from the another device and a first drawing instruction to project the image in accordance with the first annotation image information; and the step of projecting the image includes projecting the image in accordance with the first annotation image information on the first predetermined projection region in response to the first drawing instruction received in the step of receiving the first annotation image information.

13. The remote supporting method according to claim 9, wherein the step of transmitting the second annotation image information includes transmitting the second annotation image information and a second drawing instruction to project an image in accordance with the second annotation image information.

14. A computer readable medium storing a program causing a computer to execute a process for remote support, the process comprising:

receiving information about a first annotation image from another device;

projecting an image on a first predetermined projection region in cooperation with the another device in accordance with the information about the first annotation image received in the step of receiving the first annotation image information;

recording an image of the first predetermined projection region;

transmitting image information about the image of the first predetermined projection region recorded in the step of recording an image of the first predetermined projection region, as image information about the image of the first predetermined projection region to be displayed on the another device, to the another device;

transmitting information about a second annotation image to be projected on a second predetermined projection region at a site at which the another device is placed;

receiving information about the recorded image obtained by recording the image of the projection region at the site at which the another device is placed, the information being received from the another device; and displaying an image in accordance with the information about the recorded image of the second predetermined projection region received in the step of receiving the recorded image.

* * * * *